United States Patent
Tamakoshi

(10) Patent No.: US 6,958,197 B2
(45) Date of Patent: Oct. 25, 2005

(54) CONTROL SYSTEM FOR SODIUM-SULFUR BATTERY

(75) Inventor: Tomio Tamakoshi, Kasugai (JP)

(73) Assignees: NGK Insulators, Ltd., Nagoya (JP); The Tokyo Electric Power Co., Inc., Chiyoda-ku (JP)

( * ) Notice: Subject to any disclaimer, the term of this patent is extended or adjusted under 35 U.S.C. 154(b) by 306 days.

(21) Appl. No.: 10/355,892

(22) Filed: Jan. 31, 2003

(65) Prior Publication Data

US 2003/0186111 A1 Oct. 2, 2003

(30) Foreign Application Priority Data

Mar. 28, 2002 (JP) ........................................ 2002-091911

(51) Int. Cl.⁷ ........................ H01M 10/50; H01M 2/00; H01M 4/36
(52) U.S. Cl. ........................ 429/62; 429/61; 429/104
(58) Field of Search .............................. 429/61, 62, 104

*Primary Examiner*—Patrick Joseph Ryan
*Assistant Examiner*—Thomas H. Parsons
(74) *Attorney, Agent, or Firm*—Burr & Brown

(57) ABSTRACT

A control system for a sodium-sulfur battery, which is composed of a plurality of battery modules connected in series, includes a control device having at least a temperature measuring unit for measuring a temperature of each battery module, a voltage measuring unit for measuring a voltage thereof, and a current measuring unit for measuring a current thereof assembled as a single control device. Preferably, the system includes a unit for detecting the end of discharge and the end of charge. Thus, the time lag in the detection of the end of discharge and the end of charge may be prevented. The reliability of a NaS battery during long-term operation is improved. A fluctuation in the power consumption of heaters during the driving of the NaS battery is reduced. The space required for installing power equipment such as a transformer may be omitted.

8 Claims, 3 Drawing Sheets

CONTROL SYSTEM FOR SODIUM-SULFUR BATTERY

BACKGROUND OF THE INVENTION

1. Field of the Invention

The present invention is directed to a control system for a sodium-sulfur battery, which is capable of properly controlling the charge and discharge of a sodium-sulfur battery, adjusting the temperature thereof and the like, and a sodium-sulfur battery being provided with such a control system.

2. Description of the Related Art

A sodium-sulfur battery (hereinafter, sometimes referred to as a NaS battery) comprises a plurality of sodium-sulfur cells connected with each other, and being used for various practical applications. Such applications include, for example, being used as a power storage system for leveling electric power demand so as to cope with a large difference in demands during daytime and nighttime, particularly, or being used as a peak-cut power supply system for supplying electric power for time periods during which power demand sharply increases in the summer season, or being used as an emergency power supply system in natural disaster situations.

The NaS battery is used, for example, as a NaS battery power storage system in which a circuit is formed between a NaS battery, an AC/DC converter, and other components; said NaS battery being constituted from the components produced in the manner discussed below. Firstly, a NaS battery string (a group of cells) is formed by connecting a plurality of cells in series, then a NaS battery block is formed by connecting a plurality of thus formed NaS battery strings in parallel to each other. Thereafter, a plurality of a plurality of thus formed NaS battery blocks are connected in series to form a NaS battery module (hereinbelow, sometimes simply referred to as a battery module), then a NaS battery is formed by connecting a plurality of thus formed NaS battery modules in series.

The NaS battery is a secondary battery in which molten metal sodium, as a cathode active material, and molten sulfur, as an anode active material, are arranged separately from each other, using a β-alumina solid electrolyte having a selective permeability toward sodium ions. The discharge of the NaS battery is done by the following manner. Molten sodium liberates an electron, and becomes a sodium ion. Thus formed sodium ion moves toward the positive electrode by passing through said solid electrolyte and then reacts with sulfur and electrons supplied from an external circuit to produce sodium polysulfide. On the other hand, the charge is done as a reverse process of the discharge; that is, a sodium and sulfur is formed as a result of reaction of sodium polysulfide with emission of an electron. In the viewpoint of charge/discharge efficiencies, preferably, the NaS battery is operated at a high temperature of 280° C. or more in consideration of the temperature characteristics of sodium ion conductivity with respect to β-alumina. However, the operating temperature of the NaS battery is limited due to the heat resistances of various components constituting the battery, and the like. Therefore, it is important to make the NaS battery charge or discharge while keeping an operating temperature within a predetermined range of from 280 to 360° C., for example.

Further, it is also important to properly control the charging and discharging operations of the NaS battery. For example, in each cell, an open circuit voltage at the depth of full-charge is kept constant at 2.075 V. As the cell is being discharged, the electromotive voltage gradually decreases. When the discharge is completed (the end of discharge), the open circuit voltage is set to substantially 1.82 V. However, for example, a voltage measured during the discharge is lower than the open circuit voltage by the product (voltage drop) of internal resistance and a discharge current. Therefore, during the operation of the NaS battery, it is necessary to compensate for the voltage drop by adding a voltage equal to the voltage drop to the measured voltage to obtain an open circuit voltage during the discharge and then, detect the end of discharge.

A conventional control system, which has been used to implement the above proper operation of the NaS battery, comprises individual module control devices (hereinbelow, sometimes referred to as a module controller), provided for each of the battery modules laid in a frame for NaS battery, and a general-purpose control device, such as a sequencer, installed on a control panel provided independent of the frame for NaS battery. Each module controller measures a voltage and a temperature of each battery module to monitor the operating state thereof and also turns on or off a heater provided with each battery module to adjust the operating temperature of the NaS battery. For example, the NaS battery discharge current is measured using a current measuring function of the general-purpose control device, or sequencer. In the sequencer, a voltage drop is calculated to determine a discharge cutoff voltage. Thus, the end of discharge in the NaS battery can be detected. The cutoff voltage means a reference voltage is used to determine the end of charge or discharge of the NaS battery.

An illustrative showing of a conventional control system for a NaS battery is given in FIG. 2 in which five battery modules are connected in series. The control system comprises module controllers 26, one of which is provided for each NaS battery module 24 in a battery frame 21 of a NaS battery 22, and a sequencer 23 is provided on a control panel 31 that is independent of the battery frame 21 of the NaS battery 22. Each module controller 26 has a temperature measuring element, a voltage measuring element, and a heater on or off control, to control the operating temperature of the NaS battery 22 and to which heater power 27 is supplied through a heater power supply line 127. Each module controller 26 also has transmitting/receiving element, in accordance with RS-422 standard or the like, to transmit measurement data and a signal indicative of the operating state of the corresponding heater 25 to a control unit 28 of the sequencer 23. The sequencer 23 receives temperature and voltage information indicating the state of each battery module from each module controller 26 through the transmitting/receiving element, in accordance with RS-422 standard or the like. The sequencer 23 includes a measurement unit 29 for measuring an output current (discharge current) of the NaS battery 22 comprising the battery modules 24 connected in series. These measurement values and information are displayed on a display (not shown) provided on the control panel 31 and are also transmitted as external signals 20. The external signals 20 can be confirmed by remote monitoring hardware through, for example, a data link.

The above conventional control system has sufficiently served for the purpose of controlling the NaS battery in the development stage for practical application. However, with the current demand for the NaS battery as, for example, a power storage system being widespread, an improvement in long-term reliability, a reduction in the trial operating costs of equipment and a reduction in the time required for design and manufacture are further desired in the market. Then, the following problems come to exist.

(a) Misdetection at the End of Charge/Discharge

Hitherto, for example, when the end of discharge is detected, a discharge cutoff voltage $V_L$ is obtained by the following expression (1) using a discharge current $I_d$ measured by a current measurement unit of a sequencer, internal resistance R of each battery module, and a temperature coefficient $K_t$, which fluctuates with the operating temperature T:

$$V_L = V_O \times n - I_d \times R \times K_t \quad (1).$$

The discharge cutoff voltage $V_L$ is compared to the actual operating voltage V of each battery module, which is being measured by each module controller and then transmitted to the sequencer. When the following expression (2) is satisfied, it was judged to be the end of discharge:

$$V_L > V \quad (2).$$

In this instance, reference symbol $V_O$ denotes an open circuit voltage of each cell just before sodium at the negative electrode becomes short, and this open circuit voltage $V_O$ is usually about 1.82 V. Reference symbol n denotes the number of cells included in each battery module. In other words, the discharge cutoff voltage $V_L$ indicates an operating voltage at the theoretical end of discharge of the NaS battery. However, since the operating voltage V data is transmitted from the module controller to the sequencer and the comparison and the end of discharge determination are then performed, a transmission delay occurs. Accordingly, the operating voltage V is not accurately synchronized with the discharge voltage $I_d$ due to the time delay between calculating the discharge cutoff voltage $V_L$, from the discharge current $I_d$, and comparing $V_L$ to the module operating voltage V. Thus, some time lag always exists in the determination of the end of discharge. Consequently, a percentage of the charged power cannot be effectively used.

When the end of charge is detected, a charge cutoff voltage $V_H$ is calculated by the following expression (3) using a charge current $I_c$ measured by the current measurement unit of the sequencer and the internal resistance R of each battery module:

$$V_H = (V_I + \alpha) \times n - I_c \times R \quad (3).$$

The charge cutoff voltage $V_H$ is compared to the actual operating voltage V of each battery module, the voltage V being measured by each module controller and being then transmitted to the sequencer. When the following expression (4) is satisfied, it was judged to be the end of charge:

$$V_H < V \quad (4).$$

In this instance, reference symbol $V_I$ denotes an open circuit voltage of each cell at the end of charge, and this open circuit voltage $V_I$ is generally 2.075 V. Reference symbol n denotes the number of cells included in each battery block. Reference symbol a denotes polarization resistance generated at the end of charge. This polarization resistance is generally 0.05 to 0.15 V. In other words, the charge cutoff voltage $V_H$ indicates a voltage obtained by adding the polarization voltage to the open circuit voltage at the theoretical end of charge of the NaS battery. However, due to a transmission time delay, as in the case of discharging, the operating voltage V is not accurately synchronized with the charge current $I_c$. Thus, there is observed a delay between calculating the charge cutoff voltage $V_H$ from the charge current $I_c$ and comparing $V_H$ to the module operating voltage V. Thus, some time lag exists in the determination of the end of charge. Accordingly, charging is not sufficient and the full capacity of the battery cannot be effectively used.

(b) Fluctuation in Power Consumption of Heaters

A three-phase, three-wire AC power supply is used as a power supply for heaters. The heaters, provided for each of the respective battery modules, are connected to each other in balance so that each heater serves as a rated line load between two lines. For example, 10 kW is applied as a load between R-phase and S-phase, 9 kW is applied as a load between S-phase and T-phase, and 10 kW is applied as a load between T-phase and R-phase. Inherently, the heaters serve as temperature raising elements for setting the operating temperature of the NaS battery in a proper range. The heaters are individually turned on or off in accordance with the state of the NaS battery. Each conventional module controller turns each heater on or off independent of the other module controllers. Accordingly, all of the heaters are simultaneously turned on or off at a certain probability. Since a fluctuation in the power consumption of the heaters is very large, each transformer and circuit breaker needs a capacity corresponding to those of the heaters. Further, the voltage fluctuates due to changes in the heater loads.

SUMMARY OF THE INVENTION

The present invention is made in consideration of the above-mentioned problems. It is an object of the present invention to prevent misdetection of the end of charge and the end of discharge to increase the long-term reliability of a NaS battery. It is another object of the present invention to reduce fluctuations in the power consumption of heaters during the operation of a NaS battery in order to eliminate voltage fluctuations, and to omit power receiving equipment, such as a transformers, to reduce the cost of the control system.

To solve the problems, investigations have been repeatedly performed and studies have made progress. As a result, it has been found that the above objects can be accomplished by employing a system in which all elements for controlling temperatures, voltages, and currents of a predetermined number of battery modules are assembled as a single control device. In addition, a reduction in the cost of initial equipment of a NaS battery, serving as, for example, a power storage system, and a reduction in time required for the design and manufacture thereof, are expected benefits of using the system of the present invention.

According to the present invention, there is provided a control system for a sodium-sulfur battery having a plurality of battery modules connected in series or in parallel to each other, wherein there is provided a control device housing at least a temperature measuring unit for measuring a temperature of a predetermined number of battery modules, a voltage measuring unit for measuring a voltage thereof, and a current measuring unit for measuring a current thereof, as a single united system. Preferably, the system includes a unit for detecting the end of discharge and the end of charge.

When the control system is used in a sodium-battery in which each battery module has a heater, a three-phase, three-wire power supply is used to supply power to the heaters, and the respective heaters are connected so that each heater serves as a line load between lines, it is preferable that the control system is provided with a heater control unit capable of controlling the respective heaters so as to level the power consumption of the respective lines per unit time.

Preferably, the sodium-sulfur battery control system, according to the present invention, is arranged at the bottom of a sodium-sulfur battery frame on which a predetermined number of the battery modules are laid. A sodium-sulfur battery having such control system, as that mentioned above, is preferably used as a power storage system.

DESCRIPTION OF THE PREFERRED EMBODIMENT

Figure 1:
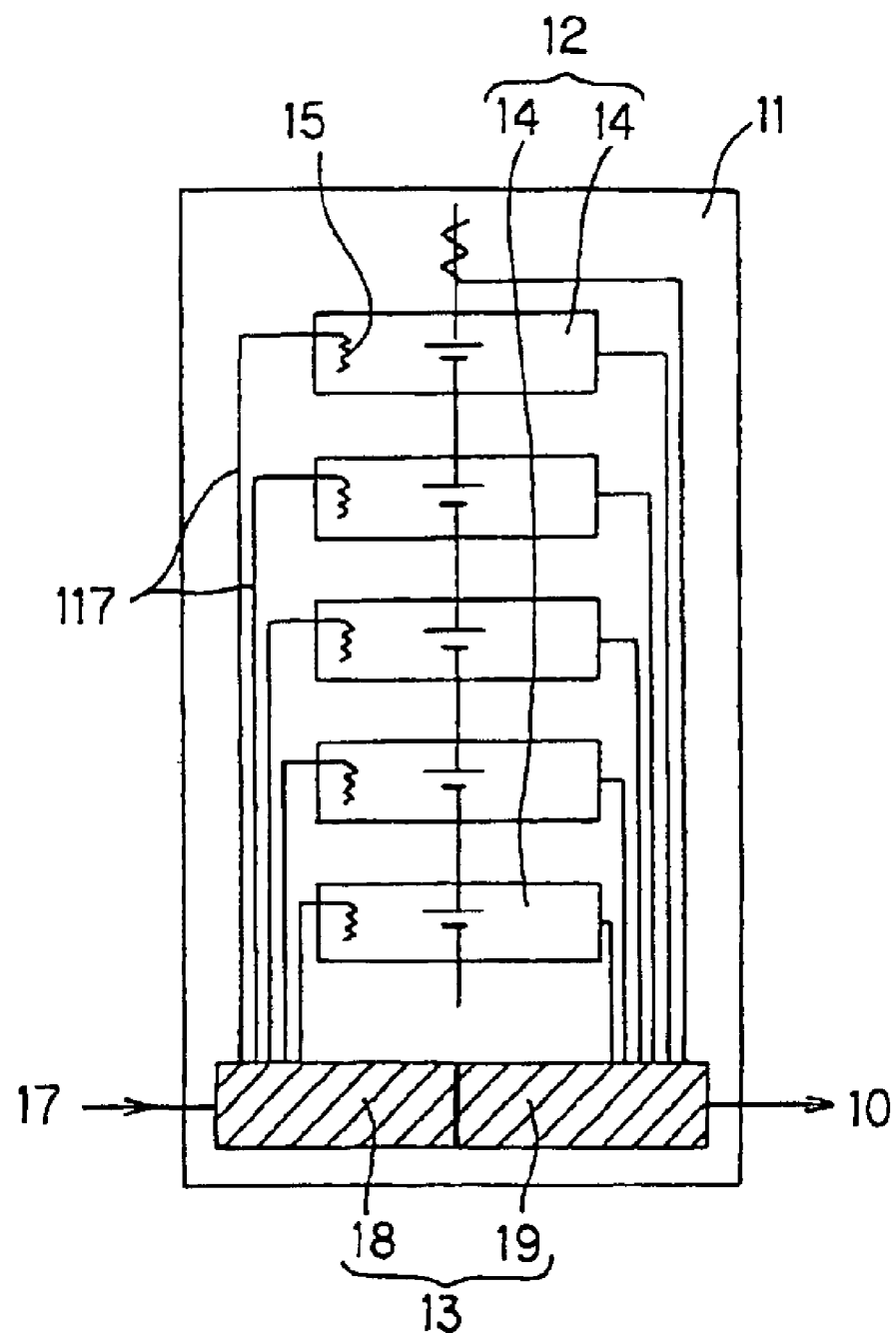
FIG. 1 is a system diagram showing the configuration of a NaS battery control system according to the present invention.
Figure 2:
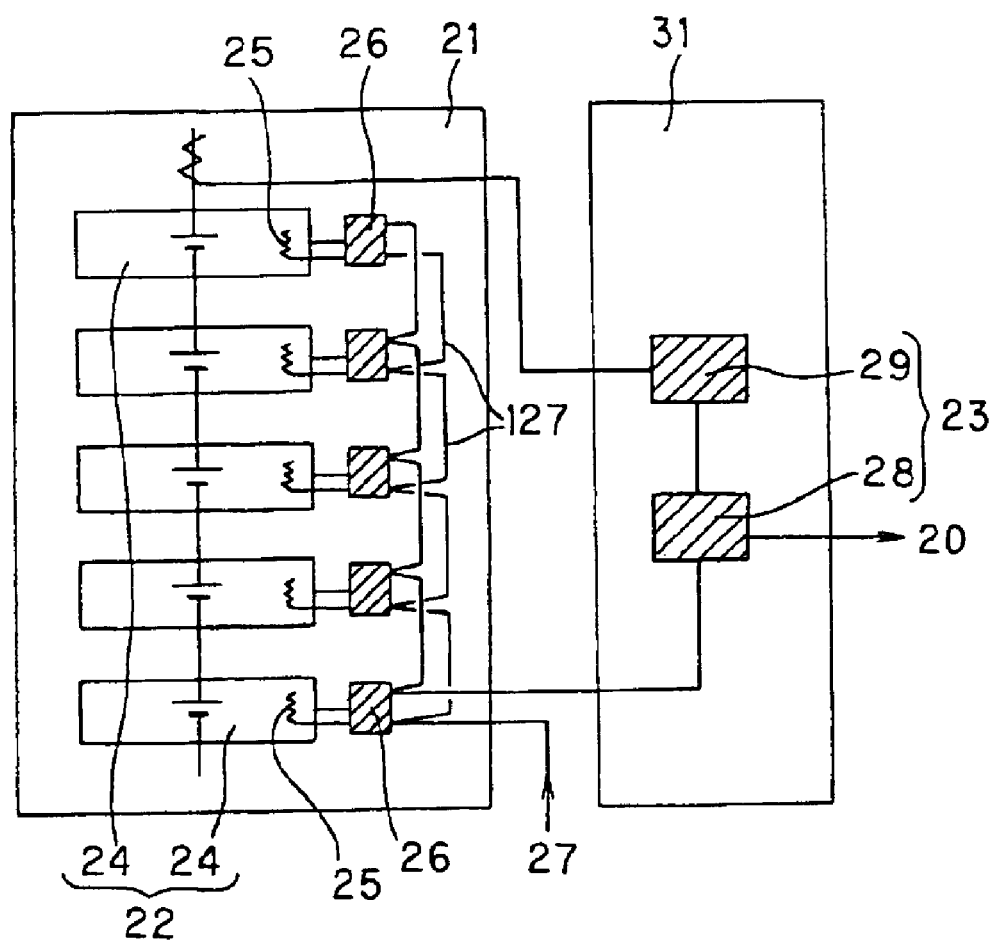
FIG. 2 is a system diagram showing the configuration of a conventional NaS battery control system.

An embodiment according to the present invention will now be described hereinbelow. A sodium-sulfur battery control system (hereinbelow, sometimes simply referred to as a control system) according to the present invention is a control system for a sodium-sulfur battery comprising a plurality of NaS battery modules in series or in parallel to each other. The upper limit of the capacity of the NaS battery, namely, the upper limit of the number of NaS battery modules is not considered to be limitative. It is considered that the control system of the present invention can handle a normal-scale NaS battery, for example, if the upper limit of the capacity of a Nas battery is set to 500 kW; such a capacity is attainable by mounting 10 NaS battery modules each having a capacity of 50 kW.

The control system according to the present invention has two aspects, namely, first aspect is directed to the management of the charging and discharging operations of a NaS battery, and second one is directed to the adjustment of actual loads on a heater power supply.

According to the first aspect, the characteristic of the control system of the present invention lies in the point that at least a temperature measuring unit or element for measuring a temperature of each battery module of the predetermined number of the battery modules, a voltage measuring unit or element for measuring a voltage thereof, and a current measuring unit or element for measuring a current thereof are all housed in a single control system. In other words, in the present control system, a single control device is being provided that can directly collect, without using a transmitting means, temperature data, voltage data, and current data by virtue of a temperature measuring unit or element, a voltage measuring unit or element, and the current measuring unit or element for each of the respective NaS battery modules. It is preferable that a temperature and a voltage can be measured individually at each NaS battery module, and a current can be measured as an output current (charge/discharge current) of the NaS battery module comprising battery modules connected in series.

Since a single control device may directly obtain temperature data, voltage data, and current data without a transmitting means, the end of discharge and the end of charge may be determined without a time delay, as long as the system includes an element or unit for detecting the end of discharge and the end of charge.

For example, in the case of detecting the end of discharge, an operating temperature T, an operating voltage V, and an discharge current $I_d$ may be accurately synchronized with each other, (i.e., taking operating temperature T of each battery module as a temperature, operating voltage V thereof as a voltage, and discharge current $I_d$ thereof as a current) because a transmitting means is not used in the present system. Accordingly, the system is provided with an end-of-discharge detecting element or unit capable of determining the end of discharge by comparing the discharge cutoff voltage $V_L$ with the actual operating voltage V according to the foregoing expression (2). The end of discharge may be more accurately determined without a time delay between the discharge cutoff voltage $V_L$, and the operating voltage V. $V_L$ serves as a reference voltage used to determine the end of discharge and is obtained by subtracting a voltage equal to a voltage drop, from the open circuit voltage ($V_O \times n$) at the theoretical end of discharge as shown in the foregoing expression (1). Thus, charged power may be effectively used. There is no problem that the battery cannot be discharged and charged any longer due to the deficiency of sodium at the negative electrode caused by over discharge. Therefore, the reliability during a long-term operation of the NaS battery may be remarkably improved.

In the case of the second aspect, the feature of the present control system lies in the point that the system is provided with a heater control element or unit capable of controlling each of the heaters in such a manner that power consumption between the respective lines is leveled on a time basis, when a heater is provided for each battery module constituting the NaS battery, a three-phase three-wire power supply is used, and the heaters are connected so as to serve as loads between lines. The expression "leveling the line power consumption on a time basis" means averaging power consumption of the heaters per unit time by staggering the times at which each of the heaters is turned on, among the lines to avoid the simultaneous turn-on of all the heaters. Thus, the capacity of the auxiliary equipment can be reduced, resulting in a reduction in the cost of equipment.

As mentioned above, according to the first aspect, a single control device includes a temperature measuring element or unit for measuring a temperature of each of the predetermined number of battery modules. Consequently, the temperatures of all the battery modules may be simultaneously measured. Therefore, there is no necessity to turn on or off the corresponding heater based on the result of the operating-temperature measurement of the corresponding battery module after the heaters have been connected in balance so that each heater serves as a rated load between two lines of the three-phase three-line power supply. That is, in the case of the control system of the present invention, one may set a time schedule so that the operating temperature of each battery module is set in a predetermined range and the power consumption of the respective lines per unit time is leveled, then, each heater is turned on or off based on this schedule. Accordingly, fluctuations in the power consumption may be reduced. Resultantly, fluctuations in voltage may also be reduced and power receiving equipment, such as a transformer, may be omitted, as well.

Further, according to the present invention, the conventional combination of control devices, a module controller for each battery module and a general-purpose sequencer, is not employed. According to the present invention, a control system equipped with a single control device capable of controlling a plural number of battery modules housed in a battery frame for a NaS battery is provided. Accordingly, the present system may be manufactured in the form of a compact control system. That is, the present control system may be housed in the battery frame for the NaS battery without using a separate control panel, resulting in a reduction in the cost of the initial equipment. In this case, preferably, the control system is placed at the bottom of the battery frame. This is because space at the bottom of the battery frame is kept at a low temperature of about 40° C. at the maximum and a low humidity of about 70% at the maximum. Accordingly, the bottom of the battery frame is preferably used as a space for placing the control system equipped with a large number of electronic devices.

Since a separate control panel is not needed, the cost required for the design and manufacture of the control panel can be omitted. In addition, the time required before delivery of the NaS battery can be shortened due to the eliminated work for the design and the manufacture of the control panel. Therefore, it is expected that the present control system would make the NaS battery easily accepted in the market, and, resultantly, this would facilitate the prevalence of the NaS battery.

The present invention will now be described in detail with reference to the drawings.

FIG. 1 is an illustrative system diagram showing a NaS battery control system according to an embodiment of the present invention. A NaS battery 12 may comprise five NaS battery modules 14, for example. A control system is placed in a battery frame 11 for the NaS battery 12. The control system comprises a control device 13 comprising a measurement control unit 19 and a heater driving unit 18. In the control device 13, the measurement control unit 19 comprises arithmetic operating unit, temperature measuring means for measuring the operating temperature T of each NaS battery module 14, voltage measuring means for measuring the operating voltage V thereof, signal output element, and network means. The measurement control unit 19 further includes current measuring unit or element for measuring a current of the NaS battery 12 comprising the NaS battery modules 14 in series.

The arithmetic operating unit may include, for example, a CPU, a memory associated therewith, and an input/output IC for transmitting data to and receiving data from the other means. The signal output element may include, for example, a voltage relay (contact) or a no-voltage relay. One may use RS 422, RS 485, DeviceNet, FLnet, EtherNet or the like as a network means.

The temperature measuring unit or element may be any device, which may include, for example, one using a thermocouple or a change in electric resistance based on temperature. Preferably, the temperature measuring unit or element can measure a temperature of a portion of each battery module, the portion corresponding to each heater. In other words, when a heater corresponding to each battery module is composed of a bottom heater segment and a side heater segment as will be described below, it is preferable that a temperature at the bottom of each battery module and a temperature at the side thereof be measured.

Preferably, the voltage measuring unit or element can measure a voltage of each battery block in each battery module. This is because accurate voltage measurement can avoid over charge or over discharge. Preferably, the current measuring unit or element can measure a current of the NaS battery 12.

The heater driving unit 18 includes relays each having a capacity which can withstand a current flowing through each heater (load) of, generally, several kW. Each relay comprises, for example, a semiconductor device. Each relay may connect or disconnect each heater power supply line 117 so that heater power 17 can be supplied to each heater 15 or can be stopped. Preferably, a fuse is connected to each relay in series in order to protect devices and lines when a short circuit occurs in the heater.

In the measurement control unit 19, measurement values (data) of a temperature, a voltage, and a current measured by the temperature measuring unit, the voltage measuring unit, and the current measuring unit are received by the arithmetic operating unit. The respective values are also transmitted as external signals 10 through the signal output unit or element and the network means.

In the arithmetic operating unit of the measurement control unit 19, during the period of discharging, the discharge cutoff voltage $V_L$ is obtained on the basis of the foregoing expression (1) using the operating temperature T measured by the temperature measuring element and the discharge current $I_d$ measured by the current measuring element. The discharge cutoff voltage $V_L$ is compared to the operating voltage V measured by the voltage measuring element. When the foregoing expression (2) is satisfied, it is judged to be the end of discharge. Thus, discharging the NaS battery 12 is terminated.

During period of charging, the charge cutoff voltage $V_H$ is obtained on the basis of the foregoing expression (3). The charge cutoff voltage $V_H$ is compared to the operating voltage V measured by the voltage measuring unit. If the foregoing expression (4) is satisfied, it is judged to be the end of charge. Thus, charging the NaS Battery 12 is terminated.

Prohibiting or stopping charging or discharging is determined on the basis of the measured temperature, voltage, and current, thus operating the NaS battery more safely.

The measurement control unit 19 allows the signal output unit or element to generate a heater control signal for each heater to the heater driving unit 18 in accordance with a predetermined schedule stored in, for example, the arithmetic operating unit or element.

In accordance with the heater control signal (for example, a contact signal) received from the measurement control unit 19, the heater driving unit 18 supplies or stops the heater power 17 to be supplied to each heater 15 through each heater power supply line 117, thereby turning each heater 15 on or off.

Figure 3:
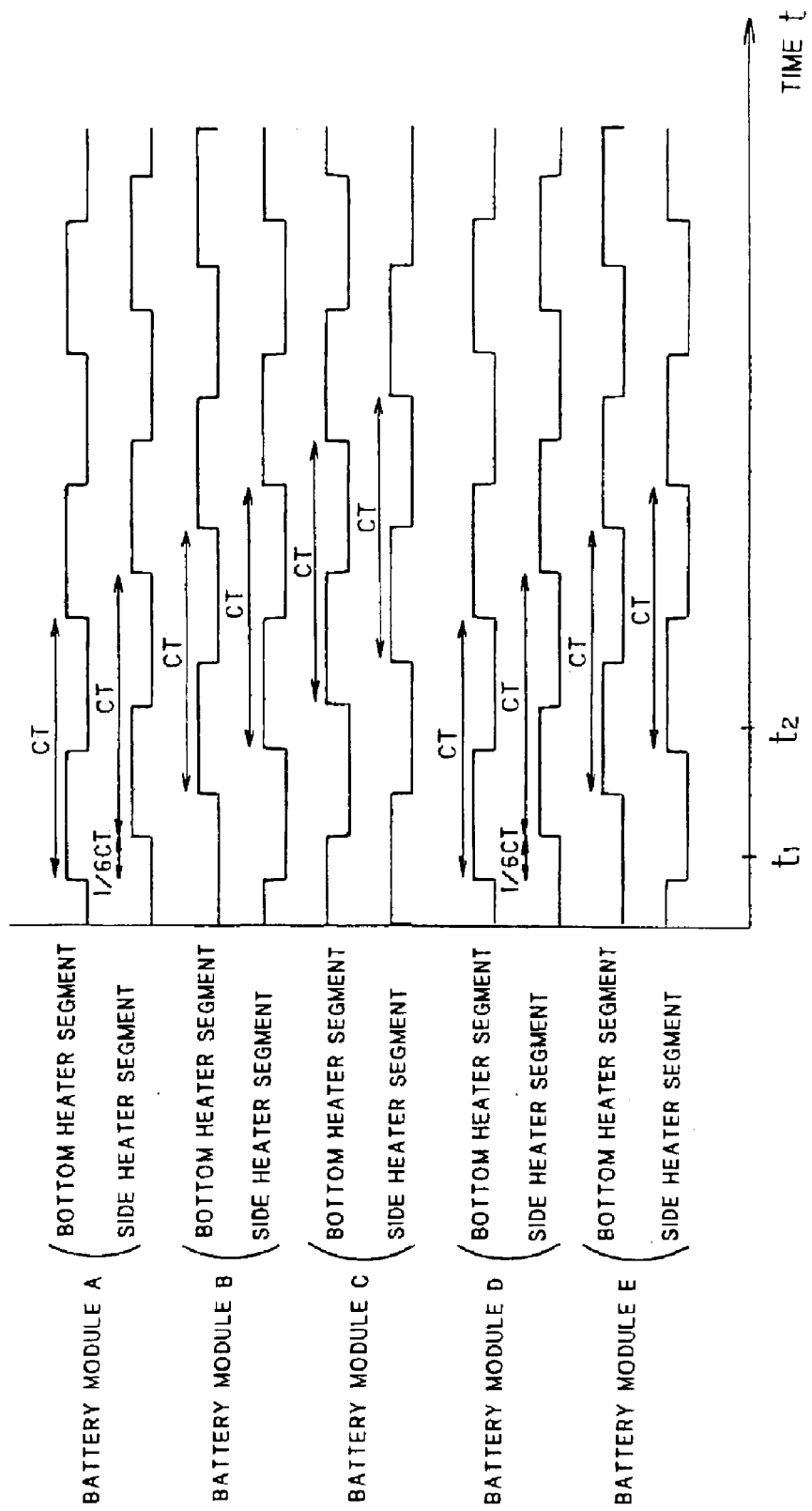
FIG. 3 shows an illustrative example of time schedule of heaters included in the control system for NaS battery according to the present invention.

FIG. 3 shows an example of a heater control schedule. According to the present embodiment, each heater is composed of a bottom heater segment (5.6 kW) and a side heater segment (1.8 kW) which are not shown in FIG. 1. The bottom heater segment and the side heater segment are controllable individually. The heaters are provided for the respective battery modules.

As shown in FIG. 3, each bottom heater segment and each side heater segment are operated so as to repeat a period CT, in which ON time and OFF time are equalized, and so as to be ⅙ CT out of phase with each other. Due to the heater control, the operating temperature of the NaS battery may be kept within the predetermined temperature range and power consumption between two lines in the three-phase three-line AC power supply is generally leveled.

The measurement values of the operating temperature, the operating voltage, and the discharge current measured by the respective measuring units or elements and a signal indicative of the state (e.g., the end of discharge) of the NaS battery can be displayed on a display (not shown) provided for on the battery frame 11 for the NaS battery 12. Further, a signal indicative of the results obtained by comparing the measurement values with various set values or fixed values stored in the measurement control unit 19 through the arithmetic operating unit or element, for example, an abnormal signal indicative of, e.g., "high temperature" can also be displayed on the display. These measurement values and signals can also be generated as external signals 10. The signals can be confirmed in, for example, a remote monitoring hardware through a network.

The format of the external signals 10 generated by the signal output unit or element and the network means is not limited. For example, analog signals (currents of 4 to 20 mA DC, voltages of 1 to 5 V DC), digital signals, pulse signals, relay contacts can be used.

The network connecting the measurement control unit 19 of the control device 13 to, for example, the remote monitoring hardware (not shown) is not limited to the foregoing network means. A network with easy wiring works to organize the network, higher communication speed, higher noise-resistant properties, and higher resistant properties to temperature changes is preferably used. A coaxial cable or an optical cable is preferably used as a line to organize a network.

As mentioned above, according to the present invention, the NaS battery can be controlled without using a separate control panel (control device). In addition, the erroneous judgement on the end of discharge hardly occurs. Further, the respective heaters between the respective lines of the three-phase three-line power supply consume power in balance. Therefore, for example, a power storage system using a NaS battery including the control system according to the present invention exhibits high long-term reliability. The time required for design and manufacture of the power storage system before the delivery thereof can be easily reduced. The power storage system wherein the present control system is employed may be made compact, thereby facilitating installation of the power storage system. The cost of the initial equipment and the cost drivers can be reduced, resulting in an increase in the demand for the power storage system.

What is claimed is:

1. A control system for a sodium-sulfur battery that includes a plurality of sodium-sulfur battery modules comprising:
    a single control device comprising:
    a temperature measuring unit capable of measuring a temperature of each battery module;
    a voltage measuring unit for measuring a voltage of each battery module; and
    a current measuring unit for measuring a current of each battery module,
    wherein said measuring units independently measure temperature, voltage and current of each battery module, and wherein said single control device reduces the misdetection of end-of-charge or end-of-discharge operations.

2. The system of claim 1, further comprising an end-of-discharge detecting unit.

3. The system of claim 2, further comprising:
    a heater for each battery module;
    a heater control unit to control each heater; and
    a three-phase, three-wire power supply to supply power to said heaters,
    wherein each of said heaters is connected as a load between the three-phase power lines, such that power consumption per unit time of the heaters is leveled.

4. The system of claim 1, further comprising:
    a heater for each battery module;
    a heater control unit to control each heater, and a three-phase, three-wire power supply to supply power to said heaters,
    wherein each of said heaters is connected as a load between the three-phase power lines, such that power consumption per unit time of the heaters is leveled.

5. A sodium-sulfur battery power storage system comprising:
    a battery frame;
    a plurality of sodium-sulfur battery modules; and
    a single control device mounted at the bottom of said battery frame and comprising:
    a temperature measuring unit capable of measuring a temperature of each battery module;
    a voltage measuring unit for measuring a voltage of each battery module; and
    a current measuring unit for measuring a current of each battery module, wherein said measuring units independently measure temperature, voltage and current for each battery module, and
    wherein said single control device reduces the misdetection of end-of-charge or end-of-discharge operations.

6. The system of claim 5, further comprising an end-of-discharge detecting unit.

7. The system of claim 6, further comprising:
    a heater for each battery module;
    a heater control unit to control each heater; and
    a three-phase, three-wire power supply to supply power to said heaters,
    wherein each of said heaters is connected as a load between the three-phase power lines, such that power consumption per unit time of the heaters is leveled.

8. The system of claim 5, further comprising:
    a heater for each battery module;
    a heater control unit to control each heater; and
    a three-phase, three-wire power supply to supply power to said heaters,
    wherein each of said heaters is connected as a load between the three-phase power lines, such that power consumption per unit time of the heaters is leveled.

* * * * *